United States Patent [19]
Laycock

[11] Patent Number: 5,761,821
[45] Date of Patent: Jun. 9, 1998

[54] GAUGING THE DIAMETER OF ECCENTRIC CYLINDRICAL WORKPIECE PARTS

[75] Inventor: Michael Laycock, Keighley, Great Britain

[73] Assignee: Western Atlas U.K. Limited, Buckinghamshire, Great Britain

[21] Appl. No.: 639,957

[22] Filed: Apr. 29, 1996

[30] Foreign Application Priority Data

May 6, 1995 [GB] United Kingdom ............... 9509294

[51] Int. Cl.$^6$ ................. G01B 7/12; G01B 7/28
[52] U.S. Cl. ................. 33/555.1; 33/550; 33/501.05
[58] Field of Search ............... 33/555.1, 501.05, 33/501.06, 501.6, 193, 549, 550, 605, 710, 711

[56] References Cited

U.S. PATENT DOCUMENTS

| | | | |
|---|---|---|---|
| 2,309,891 | 2/1943 | Fisk | 33/501.05 |
| 2,567,360 | 9/1951 | Balsiger | 33/501.05 |
| 3,802,087 | 4/1974 | Raiteri | 33/555.1 |
| 4,637,144 | 1/1987 | Schemel | 33/550 |
| 5,542,188 | 8/1996 | Ertl et al. | 33/549 |

Primary Examiner—Christopher W. Fulton
Attorney, Agent, or Firm—Lee, Mann, Smith, McWilliams, Sweeney & Ohlson

[57] ABSTRACT

A gauge for determining the diameter of an eccentric cylindrical workpiece part during grinding. The measurement is effected by a pair of fingers adapted to engage diametrically opposite regions of the part. The fingers are carried at the ends of a pair of elongate probes mounted on the grinding wheel table so as to move therewith, thereby to follow the eccentric movement of the said part in a horizontal plane, as the workpiece rotates. The probes are slidable in a generally vertical sense relative to the grinding wheel table and relative to each other. The two probes are also slidable as a unitary assembly relative to the table, in a direction towards the workpiece, with the two fingers positioned above and below the upper and lower extremities of the eccentric movement of the workpiece part, to allow subsequent gauging thereof by closure of the two fingers onto the part to make contact therewith. After grinding to size, the probes are movable to disengage the fingers from the workpiece part, and also movable away therefrom to permit relocation or removal of the workpiece. One of the probes may be slidably supported on the other probe.

13 Claims, 3 Drawing Sheets

5,761,821

1

GAUGING THE DIAMETER OF ECCENTRIC CYLINDRICAL WORKPIECE PARTS

FIELD OF INVENTION

This invention concerns methods and apparatus for gauging (that is measuring) the diameter of eccentric cylindrical workpiece parts such as crankpins of a crankshaft.

BACKGROUND TO THE INVENTION

UK Patent Specification 2161101 describes an arrangement for gauging crankshaft crankpins and the like comprising a pair of sensors engaging diametrically opposed regions of the crankpin and mounted so as to be able to follow the circular paths described by the pin around the crankshaft axis, as the latter rotates. To this end the mounting includes a pivot axis 16 (see FIG. 1) and engagement of the workpiece is assured by using the spring 11.

There is a problem of alignment of the two sensors with the crankpin so that the latter is accurately embraced by the two sensors when the assembly of sensors and carrier 10 is to be moved in a forward sense to effect the engagement. It is also necessary to drive the sensors in a forward sense to effect the engagement.

SUMMARY OF THE INVENTION

According to the present invention a gauge for determining the diameter of an eccentric cylindrical workpiece part during grinding comprises:

(a) a pair of fingers adapted to engage diametrically opposite regions of the said part, and mounted on a grinding wheel table so as to move therewith, thereby to follow the eccentric movement of the said part in a horizontal plane as the workpiece rotates, (b) a pair of elongate probes each carrying one of the fingers, and each probe being slidable in a generally vertical sense relative to the table and relative to the other probe, (c) the two probes being slidable as a unitary assembly in a direction towards the workpiece, with the two fingers positioned respectively above and below the upper and lower extremities of the eccentric movement of the workpiece part for subsequent gauging thereof by closure of the two fingers thereon to make contact therewith, and after grinding to size, to permit disengagement of the fingers from the workpiece part, and movement of the probes and fingers away therefrom to permit relocation of, or removal of the workpiece.

In one embodiment the two elongate probes are slidably mounted in independent mountings on an intermediate member which itself is slidably mounted relative to the grinding wheel table to permit movement of the probes towards and away from the table.

First drive means may be provided for moving the intermediate member relative to the wheel table and second and third drive means may be provided separately to drive the finger carrying elongate probes relative to the intermediate member.

Measurement of diameter may be effected in this first embodiment by transducer means adapted to generate a signal indicative of the separation of one finger relative to the other, which when the fingers are engaging diametrically opposed regions of the eccentric part of the workpiece, corresponds to the diameter of that part.

In this first embodiment the probes and fingers may be movable as a unitary assembly in a direction perpendicular

2 to the plane of the grinding wheel table so as to accommodate the vertical displacement of the eccentric part about its mean position whilst maintaining the two fingers in contact with the said part.

Resilient means may be provided tending to urge the fingers into contact with the opposite regions of the eccentric part, to effect and maintain the engagement.

In another embodiment one elongate probe is mounted for sliding movement relative to an intermediate member, which itself is slidably mounted relative to the grinding wheel table to permit the movement of the probes towards and away from the table, and the other elongate probe is slidably mounted on the first elongate probe, for relative movement parallel thereto.

First drive means may be provided for moving the intermediate member relative to the wheel table and second and third drive means may be provided to drive the said one elongate probe relative to the intermediate member and the other said probe relative to the first probe.

As in the first embodiment, transducer means may be provided, this time to determine the separation of one probe relative to the other, which measurement, when the fingers are engaging opposite regions of the eccentric workpiece part, corresponds to the diameter of the said part.

The fingers may be formed with bevelled corners defining a divergent entrance therebetween to facilitate engagement of the eccentric part therebetween.

In the first embodiment the drive means to the two probes may be disengageable after the two fingers have been moved so as to occupy the upper and lower extremities of the eccentric movement, whereafter resilient means is permitted to act on the two fingers to draw them towards each other so as finally to grip the eccentric part therebetween, and thereafter follow the eccentric movement whilst gauging the diameter thereof.

In the second embodiment, the drive means between the first probe and the intermediate member may be disengaged after the two fingers have been moved so as to occupy the upper and lower extremities of the eccentric movement, whereafter the second drive means effecting relative movement between the two probes is actuated so as to draw the two fingers together until they grip the eccentric part therebetween, thereafter to follow its eccentric movement whilst gauging the diameter thereof.

The second drive means may be disengageable after the fingers have engaged the eccentric part, and resilient means enabled, acting between the two probes, so as to maintain the fingers in contact with opposite regions of the eccentric part during the gauging process.

The invention will now be described by way of example with reference to the accompanying drawings in which.

DETAILED DESCRIPTION OF THE DRAWINGS

Figure 1:
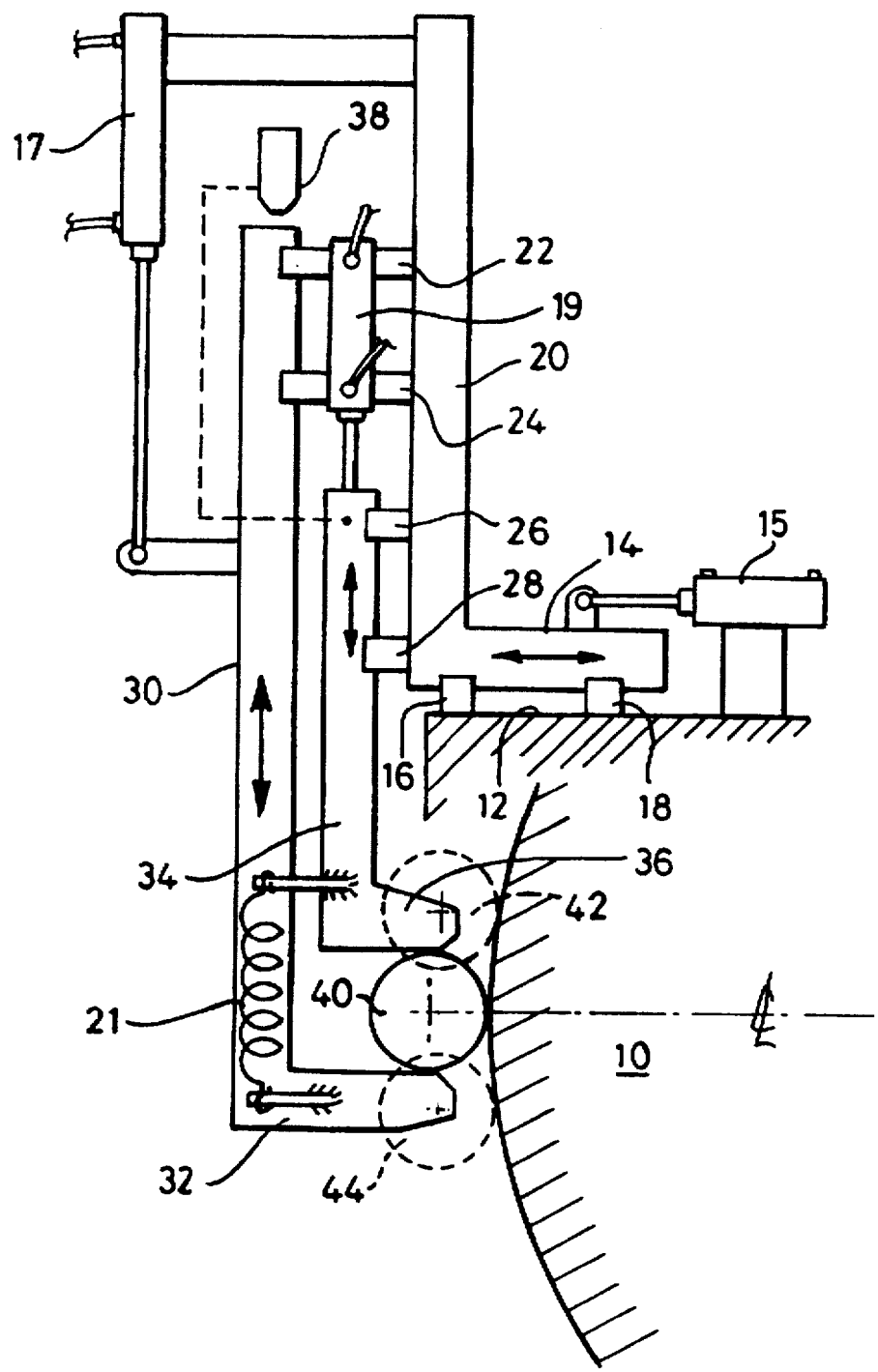
FIG. 1 is a diagrammatic side elevation of a gauge constructed as one embodiment of the invention.

FIG. 1 shows an arrangement in which a grinding wheel 10 is carried by a table part of which is shown at 12 on which a support bracket 14 is slidably mounted at 16, 18. Slideways are provided on the upright part 20 of the bracket 14, at 22, 24 and 26, 28. The former slidably support a first elongate probe 30 carrying a first finger 32 and the latter 26, 28 support a second elongate probe 34 carrying the other finger 36.

A drive 15 effects movement of the bracket 14 relative to the table 12, and the drives 17 and 19 move probes 30 and 34 relative to the upright section 20 of the bracket 14, and relative to each other, if required.

A transducer 38 determines the displacement of the probe 30 relative to the probe 34, which gives the diameter of a crankpin 40 between the two fingers 32, 36, being ground to size by the grinding wheel 10. The backward and forward movement of the wheel 10 and table 12 means that the pin 40 moves in a vertical manner relative to the wheel 10 as denoted by the displaced circular outlines 42, 44. Once the fingers 32, 36 straddle and grip the pin 40, they will follow its movement up and down, relative to the wheel.

A preferred material for the regions of the fingers which engage the workpiece is polycrystalline diamond.

A resilient spring 21 urges the fingers into engagement with the workpiece 40, after the drives 17 and 19 are disengaged and the probe 30 is freely slidable relative to the probe 34.

Figure 2:
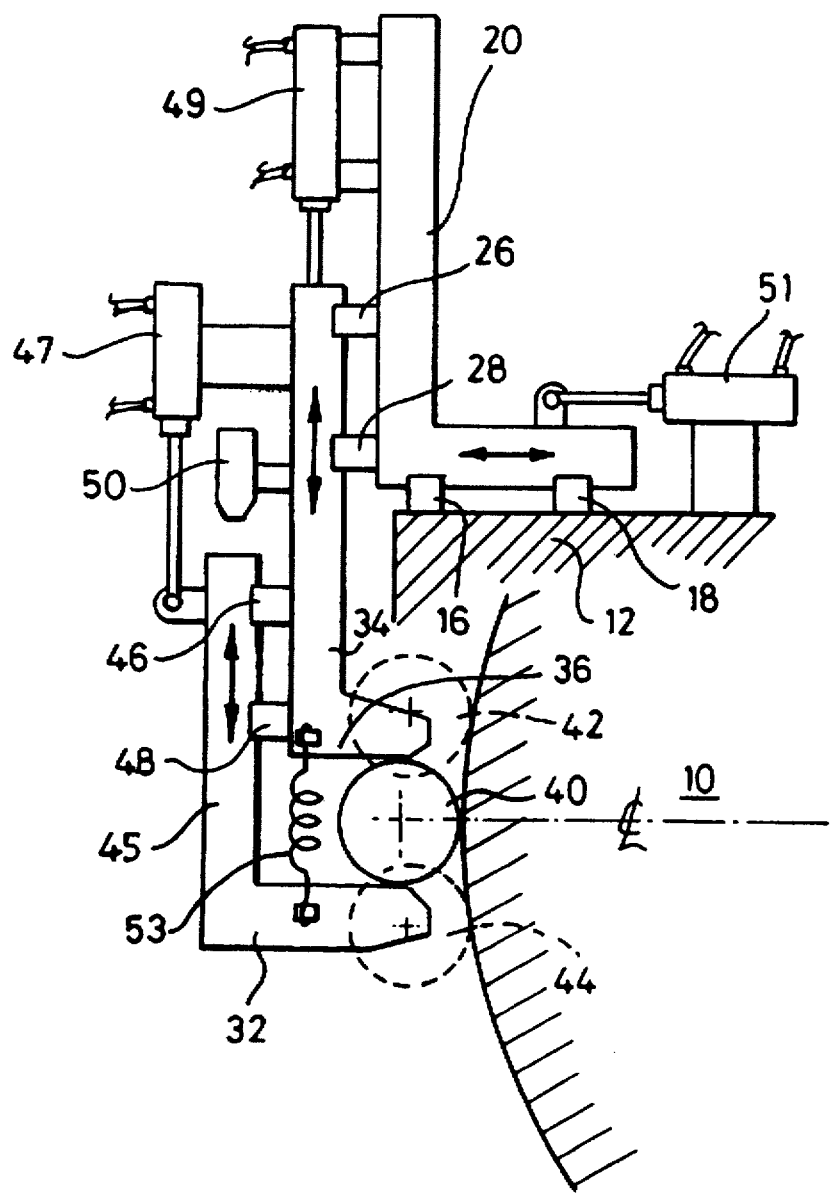
FIG. 2 is a diagrammatic side elevation of a gauge constructed as a second embodiment of the invention.

In the alternative arrangement shown in FIG. 2, the outermost probe 30 of FIG. 1 is replaced by a shorter probe 45 which is slidably mounted on the probe 34 at 46, 48. A drive 47 produces relative movement only between the two probes 34 and 44. A transducer 50 is mounted on probe 34 to determine the displacement of the probe 44 relative to the probe 34, which equals the diameter of the workpiece, when the fingers 32, 36 engage the pin 40. A drive 49 adjusts the position of probe 34 relative to the bracket 20 and drive 51 adjusts the position of brackets 20 relative to the table 12.

The fingers 36 and 32 are formed with bevelled corners defining the entrance between the two fingers, to facilitate their separation by the workpiece after the fingers have been aligned generally with the workpiece and moved laterally towards and into contact therewith.

In operation, the fingers are displaceable to such an extent that the finger 36 is higher than the highest position, and the finger 32 is lower than the lowest position of the pin 40, so that movement of the fingers 32, 36 towards the workpiece enables the two fingers to encompass the entire eccentric displacement of the workpiece. If one or both fingers are then moved towards the other by operation of the drive 47, the pin 40 will eventually become trapped between the two fingers (as shown) and the pair of fingers (and probes), move as a unitary assembly with the pin 40.

As with the FIG. 1 embodiment a resilient spring 53 can be used to maintain engagement between the fingers 32, 36 and the pin 40 after disengaging the drive 47 and enabling the probe 44 to slide freely relative to the probe 34.

Figure 3:
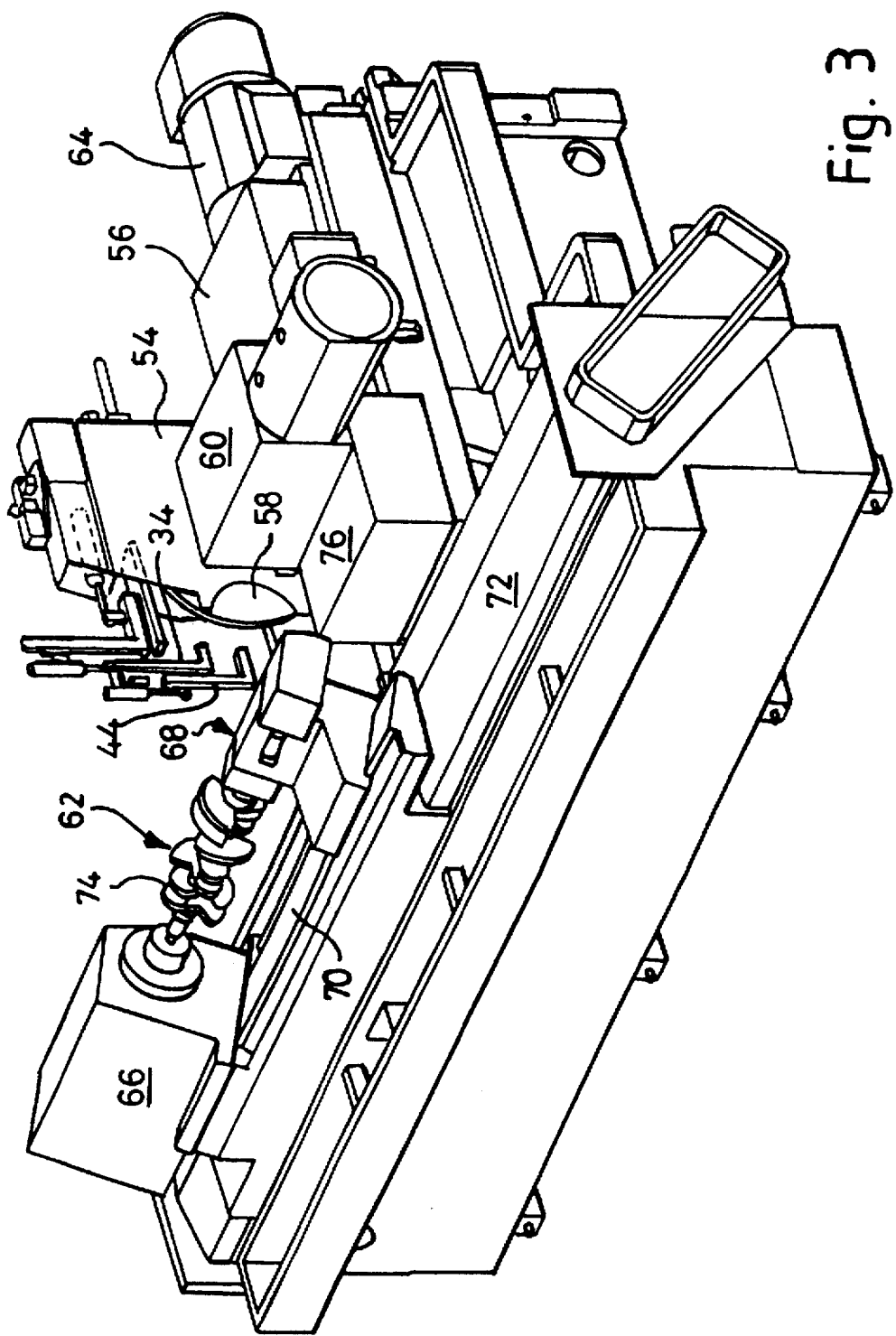
FIG. 3 is a perspective view of a grinding machine fitted with the gauge shown in FIG. 2.

FIG. 3 shows the arrangement of FIG. 2 mounted on the housing 54 which itself is fixed to, and moves with the table 56 on which a grinding wheel 58 is mounted. The wheel is driven by a wheel drive 60 and movement of the table 56 towards and away from the workpiece 62 is effected by a second drive 64.

The workpiece 62 is a crankshaft for an internal combustion engine and is mounted at one end in a headstock 66 which includes a third drive for rotating the workpiece 62 about its central axis. The opposite end of the workpiece is carried by a tailstock assembly 68, which itself is slidable along a slideway 70 to permit different length workpieces to be accommodated.

The slideway 70 is itself slidable along a second slideway 72 by a fourth drive (not shown).

The machine may be employed to grind the crankpins (one of which is shown at 74), in known manner, by moving the slideway 70 to the right until one of the crankpins such as 74 is aligned with the grinding wheel 58. The table 56 is then advanced whilst the crankshaft 62 is rotated by the headstock drive, until the grinding wheel 58 just touches the crankpin 74 when the latter is at its most displaced position towards the grinding wheel.

Thereafter synchronised advance and withdrawal of the table 56 with rotation of the crankshaft, permits contact to be maintained between the crankpin and the wheel whilst the crankpin rotates eccentrically, different regions of the pin being presented to the grinding wheel progressively as the crankshaft rotates, so that the pin is ground uniformly into a cylindrical form.

During the initial movement of the grinding wheel into engagement with the pin the probes 34, 44 are maintained in their elevated position well clear of the workpiece. Once the wheel has been advanced so as to occupy the machining position (as shown in FIG. 2), the probes can be advanced by the drive 51 until they are well beyond the workpiece, so that when lowered by drive 49 the fingers 32, 36 do not interfere with the cranked sections of the rotating crankshaft.

Operation of drive 47 so as to lower probe 44 and finger 32 below finger 36, allows the assembly to be retracted by reverse movement of drive 51 until the fingers 32 and 36 are located at the top and bottom of the eccentric movement of the pin 74 (40 in FIG. 2).

Operation of drive 47 in an opposite sense, begins to close the gap between the fingers 32, 36 and by freeing the drive 49, so the assembly of probes 34 and 44 joined by drive 47, can be made to follow the up and down movement of the pin 74 (40), when the two probes 34, 44 have been moved relative to one another by the drive 47 to such an extent that the fingers 32, 36 now straddle and both remain in contact with the pin 74 (40) at all times during the rotation of the crankshaft.

The separator between the two fingers 32, 36 is now determined by the transducer 50, which therefore indicates the diameter of the pin 74 (40).

Removal of positive drive from 47 allows the spring 53 to take over the job of keeping the two fingers 32, 36 in contact with the pin 74 (40), as the assembly of probes slides in 26,28 relative to the bracket 20.

Continued grinding of the pin reduces its diameter and when the desired diameter is reached, as indicated by the signal from the transducer 50, the drive 64 is reversed momentarily to disengage the wheel from the workpiece.

Drive 47 then operates to separate the fingers 32, 36 and drive 51 is operated to move bracket 20 away from the grinding wheel so that the pins 32, 36 are completely disengaged from the pin 74 (40), allowing drive 49 to raise the probes 34, 44 into their elevated position again with the fingers 32, 36 well clear of the rotating workpiece.

After further retraction of the wheel, by operation of drive 64, the slideway 70 can be adjusted so as to present the next crankpiece along the crankshaft to the grinding wheel, and the procedure is repeated so as to grind the next pin to size.

A control system (not shown) receives signals from transducers located on the slideways and associated with the table and workpiece drive, to allow the relative positions of the grinding wheel, wheelhead, workpiece and probes/fingers to be determined, and for control signals to be generated to operate the various drives to achieve the sequence of movement described above.

I claim:

1. A gauge for determining the diameter of an eccentric cylindrical workpiece part which is rotatable about an eccentric axis during grinding, comprising:

(a) a pair of fingers adapted to engage diametrically opposite regions of the said part, and mounted on a grinding wheel table so as to move therewith, thereby to follow the eccentric movement of the said part in a horizontal plane, as the workpiece rotates, (b) a pair of elongate probes each carrying one of the fingers, and each probe being slidable in a generally vertical sense relative to the table and relative to other probe, (c) slide means for moving the two probes as a unitary assembly in a generally horizontal direction towards the workpiece, with the two fingers positioned above and below the upper and lower extremities of the eccentric movement of the workpiece part for subsequent gauging thereof by closure of the two fingers thereon for engagement therewith, whereby after said part has been ground to size the fingers are disengageable therefrom so that the probes and fingers are movable away from said part to permit relocation or removal of the workpiece.

2. A gauge as claimed in claim 1 wherein the two elongate probes are slideably mounted in independent mountings on an intermediate member which itself is slidably mounted relative to the grinding wheel table to permit the said eccentric movement of probes towards and away from the table.

3. A gauge as claimed in claim 2 wherein first drive means is provided for moving the intermediate member relative to the grinding wheel table and second and third drive means are provided to separately move the elongate probes relative to the intermediate member.

4. A gauge as claimed in claim 1 in which transducer means generates a signal indicative of the separation displacement of one probe relative to the other, whereby when the fingers are engaging diametrically opposed region of said workpiece part, said displacement corresponds to the diameter thereof.

5. A gauge as claimed in claim 1 wherein the probes and fingers are movable as a unitary assembly in a direction perpendicular to the plane of the grinding wheel table so as to accommodate the vertical displacement of the workpiece part about its mean position whilst maintaining the two fingers in contact with said workpiece part.

6. A gauge as claimed in claim 1 wherein resilient means is provided tending to urge the fingers into contact with the opposite regions of the workpiece part.

7. A gauge as claimed in claim 1 wherein one elongate probe is mounted for sliding movement relative to an intermediate member, which itself is slidably mounted relative to the grinding wheel table to permit the movement of the probes towards and away from the table, and the other elongate probe is slidably mounted on the first elongate probe, for relative movement parallel thereto.

8. A gauge as claimed in claim 7 wherein a first drive means is provided for moving the intermediate member relative to the grinding wheel table, and second and third drive means is provided to drive the said one probe relative to the intermediate member and said other probe relative to the first probe.

9. A gauge as claimed in claim 8 wherein transducer means determines the separation displacement of one probe relative to the other, whereby when the fingers are engaging diametrically opposed regions of said workpiece part, said displacement corresponds to the diameter thereof.

10. A gauge as claimed in claim 1 in which the fingers are formed with bevelled corners defining a divergent entrance therebetween to facilitate engagement of said workpiece part therebetween.

11. A gauge as claimed in claim 1 wherein the drive means to the two probes is disengageable after the two fingers have been moved so as to occupy the upper and lower extremities of the eccentric movement, whereafter resilient means acts on the two fingers to draw them towards each other so as to grip said workpiece part therebetween and thereafter follow the eccentric movement whilst gauging the diameter thereof.

12. A gauge as claimed in claim 1 wherein the drive means between the first probe and the intermediate member is disengageable after the two fingers have been moved so as to occupy the upper and lower extremities of the eccentric movement, whereafter the second drive means effecting relative movement between the two probes may be actuated so as to draw the two fingers together until they grip the eccentric part therebetween, thereafter to follow its eccentric movement whilst gauging the diameter thereof.

13. A gauge as claimed in claim 12 wherein the second drive means is disengageable after the fingers have engaged said workpiece part, and resilient means is enabled, acting between the two probes, so as to maintain the fingers in contact with opposite regions of the eccentric part.

* * * * *